US012589995B2

(12) United States Patent
George et al.

(10) Patent No.: US 12,589,995 B2
(45) Date of Patent: Mar. 31, 2026

(54) PROCESS AND SYSTEM FOR PROVIDING PURIFIED HYDROGEN GAS

(71) Applicant: HYDROGENIOUS LOHC TECHNOLOGIES GMBH, Erlangen (DE)

(72) Inventors: Michael George, Darmstadt (DE); Daniel Baschke, Gößweinstein (DE); Holger Büch, Erlangen (DE); Rico Westerath, Erlangen (DE); Caspar Paetz, Erlangen (DE)

(73) Assignee: HYDROGENIOUS LOHC TECHNOLOGIES GMBH, Erlangen (DE)

( * ) Notice: Subject to any disclaimer, the term of this patent is extended or adjusted under 35 U.S.C. 154(b) by 373 days.

(21) Appl. No.: 18/548,627

(22) PCT Filed: Mar. 3, 2022

(86) PCT No.: PCT/EP2022/055333
§ 371 (c)(1),
(2) Date: Sep. 1, 2023

(87) PCT Pub. No.: WO2022/184803
PCT Pub. Date: Sep. 9, 2022

(65) Prior Publication Data
US 2024/0150171 A1 May 9, 2024

(30) Foreign Application Priority Data
Mar. 5, 2021 (DE) .................... 10 2021 202 170.0

(51) Int. Cl.
*B01D 53/02* (2006.01)
*B01D 53/04* (2006.01)
(Continued)

(52) U.S. Cl.
CPC ............ *C01B 3/56* (2013.01); *B01D 53/0462* (2013.01); *B01D 53/0476* (2013.01);
(Continued)

(58) Field of Classification Search
CPC ........ B01D 2253/102; B01D 2253/108; B01D 2256/16; B01D 2258/0283;
(Continued)

(56) References Cited

U.S. PATENT DOCUMENTS

| | | | | |
|---|---|---|---|---|
| 9,517,981 B2* | 12/2016 | Wynn | ..................... | C01B 3/501 |
| 2005/0045030 A1* | 3/2005 | Tonkovich | ......... | B01D 53/0446 |
| | | | | 95/90 |

(Continued)

FOREIGN PATENT DOCUMENTS

| | | |
|---|---|---|
| DE | 102016222596 A1 | 5/2018 |
| DE | 102017217748 A1 | 4/2019 |

(Continued)

*Primary Examiner* — Christopher P Jones
(74) *Attorney, Agent, or Firm* — McGlew and Tuttle, P.C.

(57) ABSTRACT

A plant for providing purified hydrogen gas comprises a dehydrogenation unit for releasing a dehydrogenation mixture comprising hydrogen gas and at least one impurity from an at least partly laden hydrogen carrier medium, a separation/purification unit fluidically connected to the dehydrogenation unit, for removing the hydrogen gas from the dehydrogenation mixture, a purge gas feed fluidically connected to the separation/purification unit, for feeding purge gas into the separation/purification unit (6), a thermal conversion unit fluidically connected to the separation/purification unit, for thermally converting a tail gas mixture comprising the purge gas and at least one impurity, and a heat transfer unit for transferring heat generated in the thermal conversion unit to the dehydrogenation unit.

23 Claims, 3 Drawing Sheets

(51) Int. Cl.
     *B01D 53/047*      (2006.01)
     *C01B 3/56*        (2006.01)

(52) U.S. Cl.
     CPC .. *B01D 2253/102* (2013.01); *B01D 2253/108*
          (2013.01); *B01D 2256/16* (2013.01); *C01B*
                       *2203/043* (2013.01)

(58) Field of Classification Search
     CPC .............. B01D 53/0462; B01D 53/047; B01D
                53/0476; C01B 2203/0277; C01B
                2203/043; C01B 3/22; C01B 3/56
     See application file for complete search history.

(56)                 References Cited

U.S. PATENT DOCUMENTS

2006/0249020 A1 *  11/2006  Tonkovich ............. B01D 53/04
                                        62/130
2018/0069255 A1 *  3/2018  Cheng ........................ C01B 3/22
2022/0041529 A1 *  2/2022  de Menezes .............. C07C 2/06

FOREIGN PATENT DOCUMENTS

DE     102018221447 A1   6/2020
DE     102019202657 A1   8/2020
EP         1826177 A2   8/2007

* cited by examiner

PROCESS AND SYSTEM FOR PROVIDING PURIFIED HYDROGEN GAS

CROSS-REFERENCES TO RELATED APPLICATIONS

This application claims the priority of German Patent Application, Serial No. DE 10 2021 202 170.0, filed on Mar. 5, 2021, the content of which is incorporated here by reference in its entirety as if fully set forth herein.

SUMMARY OF THE INVENTION

The invention relates to a method and a plant for providing purified hydrogen gas.

BACKGROUND OF THE INVENTION

DE 10 2016 222 596 A1 discloses a method for providing hydrogen gas in which following release of hydrogen gas by at least partial dehydrogenation of a hydrogen carrier medium, the hydrogen gas released is purified for example by pressure swing adsorption. Pressure swing adsorption is a physical method for separating gas mixtures under pressure by means of adsorption. Impurities removed from the gas mixture are adsorbed on an adsorbent material (adsorbent for short), resulting in increasing saturation of the adsorbent and hence in limitation to the efficiency of the pressure swing adsorption. By means of regular purging procedures, the impurities can be parted from the adsorbent by means of a purge gas and flushed out. The purge gas with the parted impurities is delivered to the surroundings. A method of this kind has poor economics and features pollutant emissions. Hydrogen gas which has initially been removed in the separation/purification unit, i.e., has been purified, can later be used as purge gas for purging in the separation/purification unit. This limits the efficiency of the method, as the quantity of purified hydrogen gas provided is reduced.

SUMMARY OF THE INVENTION

The invention is based on an object of improving the provision of purified hydrogen gas from economic standpoints and in particular of reducing the emissions involved in the provision of purified hydrogen gas.

The object is achieved by a method for providing purified hydrogen gas, comprising the method steps of releasing a dehydrogenation mixture comprising hydrogen gas and at least one impurity from an at least partly laden hydrogen carrier medium in a dehydrogenation unit, removing the hydrogen gas from the dehydrogenation mixture in a separation/purification unit, purging the separation/purification unit by means of a purge gas fed in via a purge gas feed, thermally converting a tail gas mixture comprising the purge gas and at least one impurity, in a thermal conversion unit, and transferring heat generated in the thermal conversion unit to the dehydrogenation unit by means of a heat transfer unit.

The object is further achieved with a plant for providing purified hydrogen gas, comprising a dehydrogenation unit for releasing a dehydrogenation mixture comprising hydrogen gas and at least one impurity from an at least partly laden hydrogen carrier medium, a separation/purification unit fluidically connected to the dehydrogenation unit, for removing the hydrogen gas from the dehydrogenation mixture, a purge gas feed fluidically connected to the separation/purification unit, for feeding purge gas into the separation/purification unit, a thermal conversion unit fluidically connected to the separation/purification unit, for thermally converting a tail gas mixture comprising the purge gas and at least one impurity, and a heat transfer unit for transferring heat generated in the thermal conversion unit to the dehydrogenation unit. At the heart of the invention is the thermal conversion, in a thermal conversion unit, of a tail gas mixture which comprises purge gas used for purging a separation/purification unit and at least one impurity removed during purging from the separation/purification unit. The at least one impurity may comprise a combustible compound, more particularly a carbon-containing compound and/or hydrogen gas, more particularly in small amounts. Carbon-containing compound refers in particular to the total organic carbon (TOC). A carbon-containing compound more particularly is an aromatic hydrocarbon, more particularly benzene, toluene and/or xylene, which may also be referred to collectively in abbreviated form as BTX. BTX comprises volatile organic compounds. The heat generated in the thermal conversion unit is transferred to a dehydrogenation unit, to promote a dehydrogenation reaction of at least partly laden hydrogen carrier medium in the dehydrogenation unit. The transfer of heat from the thermal conversion unit to the dehydrogenation unit takes place by means of a heat transfer unit. The energy consumption for the dehydrogenation reaction is reduced. The overall energy consumption for the provision of purified hydrogen gas is reduced as a result. The energy efficiency is improved.

The separation/purification unit is an adsorptive separation/purification unit. In particular, the separation/purification unit is suitable for carrying out a pressure swing adsorption (PSA) and more particularly a temperature-pressure swing adsorption (TPSA). The pressure swing adsorption may be configured as a vacuum pressure swing adsorption, operating with pressures below atmospheric pressure. A combination of vacuum pressure swing and temperature-pressure swing adsorption (TVPSA) is also conceivable.

In the separation/purification unit, the hydrogen gas is removed from the dehydrogenation mixture, in particular by adsorption.

It has been found in particular that it is not necessary for the purge gas used to comprise hydrogen gas removed beforehand in the separation/purification unit. The hydrogen yield is increased.

The purge gas is in particular provided separately. This means that the purge gas is provided in particular independently from the release of the hydrogen gas in the dehydrogenation unit and/or from the removal of the hydrogen gas from the dehydrogenation mixture in the separation/purification unit.

The purge gas has in particular a reduced hydrogen fraction, thus being hydrogen-lean such as, for example, methane and/or air, more particularly ambient air. A maximum hydrogen fraction in the purge gas in this case is at most 5 vol %, more particularly at most 4 vol %, more particularly at most 3 vol %, more particularly at most 2 vol % and more particularly at most 1 vol %. The purge gas more particularly is hydrogen-free, thus having 0% hydrogen, such as nitrogen gas ($N_2$), for example. Also contemplated as purge gas is ethane, propane or butane.

A purge gas feed may be formed for example by a storage vessel in which the purge gas is held in reserve and is provided for purging the separation/purification unit. In this case, the storage vessel for the purge gas is connected by means of a purging conduit to the separation/purification unit. Alternatively, the purge gas feed may be formed solely by a purge gas conduit which is connected to the separation/purification unit. The purge gas conduit may be supplied, for example, from a central gas supply conduit, which in particular may be developed locally, regionally, supra-regionally and/or internationally. It is also conceivable for the purge gas line opening into the separation/purification unit to be utilized with a further component of the plant for feeding purge gas directly from another component.

The purge gas may in particular be conditioned, more particularly heated, more particularly before it is fed to the separation/purification unit. The use of conditioned purge gas allows the desorption of the impurities from the adsorbent material to be assisted and thereby accelerated. An increase in the temperature for the purge gas in combination with a lowering of the pressure is also referred to as temperature-pressure swing adsorption (TPSA). If the pressure is reduced to a level below atmospheric pressure, this is referred to as temperature-vacuum pressure swing adsorption (TVPSA). Serving to implement TVPSA is, in particular, a vacuum pump, for lowering the pressure within the separation/purification unit during the purging procedure to a reduced pressure of at most 100 mbar, more particularly at most 50 mbar, more particularly at most 20 mbar and more particularly of at most 10 mbar. The amount of purge gas required is likewise reduced as a result.

It is advantageous if a buffer vessel is interposed between the separation/purification unit and the thermal conversion unit in order to reduce and more particularly prevent pressure fluctuations, i.e., pulses in the pressure swing.

For the temperature increase, the adsorbent material, present more particularly as an adsorber bed, may be heated directly. Additionally or alternatively, heat may be introduced by means of a heated purge gas that indirectly heats the adsorbent material and supports the endothermic desorption procedure.

The purge gas may be heated via an external heater or an internal heater. An external heater, i.e., the heating of the purge gas by means of an external source, is more particularly possible by means of an electric heater, more particularly within a pipe conduit. There may in particular be multiple heating elements disposed within the pipe conduit. A heat exchanger may be used additionally or alternatively. It is also conceivable to utilize waste heat, especially in the form of steam, in particular at an industrial site.

Internal heating relates to the utilization of waste heat within the method of the invention. In particular, the hydrogen gas released in the dehydrogenation unit is discharged from the dehydrogenation unit at a temperature of more than 200° C. and is cooled in particular in multiple stages down to a setpoint temperature. The setpoint temperature which is advantageous for the pressure swing adsorption is typically less than 45° C. For the internal heating, therefore, a heat exchanger, more particularly an additional heat exchanger, can be utilized and may be disposed in particular between a condensing unit, known as the condenser, and a hydrogen gas cooler. As a result, it would be possible in particular to cool the dehydrogenation mixture from the dehydrogenation unit. The dehydrogenation mixture constitutes a hydrogen gas-containing gas which is to be fed to the separation/purification unit. By utilizing the waste heat from the method it is possible for the additional energy input for heating the purge gas to be reduced and in particular to be dispensable. In particular, additional cooling power which would be required for cooling the hydrogen-containing mixture is reduced. More particularly, the overall method can be improved from the standpoints of energy and economics, and its efficiency in particular boosted.

To remove impurities, especially hydrocarbons, in the desorption, the temperatures are about 50° C. to 150° C. with a desorption pressure of, for example, 1 bar or less, more particularly at most 100 mbar when using a vacuum pump. The desorption temperature, i.e., the temperature to which the purge gas must be heated, is below the thermal level of the available heat flow of the hydrogen stream to be cooled, of about 220° C. The desorption temperature is dependent in particular on the desorption pressure, on the volume flow of the purge gas and/or on the duration of the purging procedure. The higher the desorption temperature, the more rapidly the desorption takes place, the lower the desorption time, and the higher the level at which the desorption pressure can be selected during the desorption procedure.

It has been recognized that the impurities adsorbed in the separation/purification unit are beneficial to, and more particularly enable, the thermal conversion in the thermal conversion unit. Impurities are, in particular, the total organic carbon (TOC), more particularly aromatic hydrocarbon compounds, especially benzene, toluene and/or xylene, which is present in particular with a fraction of at least 10 ppmV, more particularly of at least 50 ppmV, more particularly of at least 100 ppmV, more particularly of at least 300 ppmV, more particularly of at least 500 ppmV, more particularly of at least 1000 ppmV, more particularly of at least 1200 ppmV and more particularly of at most 1500 ppmV; water and/or inert gases such as nitrogen ($N_2$), which are present each in an amount of about 50 ppmV to 300 ppmV, more particularly of about 100 ppmV to 250 ppmV and more particularly at most 200 ppmV; methane ($CH_4$), which is present in an amount of less than 200 ppmV, more particularly between ppmV and 150 ppmV; and also carbon monoxide (CO) and/or carbon dioxide ($CO_2$), which are present each with an amount of less than 50 ppmV, more particularly less than 20 ppmV and more particularly less than 10 ppmV. A finding of the invention is that by mixing the purge gas with the at least one impurity, a combustible tail gas mixture is formed in particular that can be converted, more particularly burnt, advantageously in the thermal conversion unit, hence allowing heat to be generated that can be utilized in the dehydrogenation unit. The calorific value is increased. It has been found in particular that the mass weight fraction of the combustible impurities in the tail gas mixture is dependent on the purge gas selected and the amount thereof used, on the one hand, and on the operating parameters of the dehydrogenation reaction, on the other. In this context it is possible to attain mass weight fractions of the combustible impurity of up to 10% or more, more particularly between 1% and 30%, more particularly between 2% and 20% and more particularly between 5% and 10%.

Gas analysis of the tail gas mixture in situ by means of a dedicated sensor is advantageous. It allows the composition of the tail gas mixture to be captured and considered for the operation of the thermal conversion unit. In particular, changes in the composition of the tail gas mixture can be considered accordingly. This is relevant especially when the dehydrogenation unit is operated dynamically, in other words, in particular, with changing reaction pressures and/or reaction temperatures, which then result in a change in the composition for the tail gas mixture.

A catalytic reaction takes place in the dehydrogenation unit, with the at least partly laden hydrogen carrier medium being contacted with a catalyst. As a result, a dehydrogenation mixture is released from the hydrogen carrier medium. The dehydrogenation mixture comprises hydrogen gas and the at least one impurity. The dehydrogenation mixture may further comprise hydrogen carrier medium, which in particular may be in vapour form and/or in the form of small liquid droplets. The dehydrogenation mixture is more particularly a gas mixture. The dehydrogenation mixture is transferred from the dehydrogenation unit into the separation/purification unit. In the separation/purification unit, the hydrogen gas is removed, in particular at least partly, from the dehydrogenation mixture by pressure swing adsorption, more particularly by contact of the dehydrogenation mixture with an adsorbent material.

The hydrogen carrier medium is in particular a liquid organic hydrogen carrier (LOHC). The hydrogen carrier medium comprises, in particular, dibenzyltoluene, benzyltoluene and/or toluene, and also their hydrogenated compounds: perhydrodibenzyltoluene, perhydrobenzyltoluene and/or methylcyclohexane. The hydrogen carrier medium may be reversibly laden and unladen with hydrogen by means of catalytic hydrogenation and dehydrogenation reactions.

The catalyst required for the dehydrogenation reaction comprises a catalyst material which in particular is disposed on a catalyst support and more particularly fixed on the catalyst support. Serving as catalyst supports are, in particular, aluminium oxide, silicon oxide, silicon carbide and/or activated carbon. The catalyst support is, in particular, inert. The weight fraction of the catalyst material, based on the catalyst support, is in particular between 0.1% and 10%. The catalyst material comprises in particular a metal, more particularly platinum, palladium, nickel, rhodium and/or ruthenium.

The advantages according to the invention are to be seen in particular in the boosted efficiency of the overall dehydrogenation process. In particular, the amount of fuel used is reduced. In particular, the amount of combustion air used can be reduced, especially where the purge gas used comprises air, more particularly ambient air.

A method, in which purge gas used comprises a combustion gas, more particularly a carbon-containing combustion gas, more particularly methane, propane and/or butane, enables improved thermal conversion. The heat generated in the thermal conversion unit is increased. As a result, the heat provided for the dehydrogenation unit is increased. The overall efficiency of the method is improved. It is, however, also possible to use hydrogen gas at least additionally to a combustion gas or on its own, i.e., without further combustion gas, as the purge gas.

As a result of the thermal conversion of the offgas, the emissions of harmful substances are reduced and, in particular, they consequently meet statutory requirements and/or limiting values for pollution control such as, in particular, the German Technical Instructions on Air. By virtue of the reduced offgas emissions, changeover intervals for the replacement of activated carbon filters at emission sites in such a plant, for compliance with limiting pollution control values, are extended. In particular, such activated carbon filters may be entirely unnecessary. The maintenance expenditure and in particular the usage of materials are reduced. The economics of such a method are enhanced.

A method, in which purge gas used comprises air, more particularly ambient air, is particularly uncomplicated and cost-efficient. In particular there is no need for purge gas to be provided separately. In particular it has been recognized that through its use as purge gas and through mixing with the at least one impurity, incombustible air is converted into a combustible tail gas mixture and is upgraded in terms of the thermal conversion, so that the tail gas mixture thus formed is combustible.

It is conceivable in particular for the purge gas utilized to comprise a mixture of combustion gas according to the invention and ambient air according to the invention. Such a mixture has advantageous combustion properties.

A method, in which purge gas used comprises the dehydrogenation mixture, is particularly uncomplicated and therefore cost-efficient. Separate purge gas is not required. In particular, the plant complexity is reduced.

Additionally or alternatively it is possible to feed the dehydrogenation mixture directly to the thermal conversion of the thermal conversion unit. As a result, it is possible to enable independent provision of heat, more particularly in a time-flexible manner.

A method, in which purge gas used comprises the hydrogen gas removed in the separation/purification unit, lacks complexity because additional purge gas sources are dispensable. In particular, a closed circuit can be formed of the components which are necessary anyway in the plant. Released and purified hydrogen gas as purge gas leads in particular to a reduction in $CO_2$ emissions.

Additionally or alternatively it is possible for at least a proportion of purified hydrogen gas to be passed back directly to the thermal conversion unit and thermally converted there additionally or alternatively to the tail gas mixture. It is consequently possible in particular for the dehydrogenation reaction in the dehydrogenation unit to be able to be carried out independently of other energy sources.

A method, in which the purge gas is fed to the thermal conversion unit directly, more particularly via a direct conduit, enables an efficiency boost in the provision of the heat for the dehydrogenation unit. By means of a direct conduit, in particular, the purge gas can be fed directly into the thermal conversion unit. The direct conduit forms a bypass with respect to the separation/purification unit. The purge gas serves directly as combustion gas in the thermal conversion unit, in particular independently of the purging procedure in the separation/purification unit. As a result, heat for the dehydrogenation unit can be provided flexibly and, in particular, time-independently. The method is especially suitable when combustion gas and/or air are used as purge gas.

A method, in which the purge gas contacts an adsorbent, more particularly a porous material and more particularly zeolite, silica, activated carbon, aluminium oxide and/or a carbon molecular sieve, in the separation/purification unit and thereby parts the at least one impurity from the adsorbent, enables an upgrading of the purge gas, more particularly of the incombustible purge gas, more particularly air, more particularly ambient air, by mixing with the at least one impurity parted from the adsorbent. As a result, the purge gas is converted into a combustible tail gas mixture. This raises the energy efficiency.

A method, in which the heat transferred from the thermal conversion unit to the dehydrogenation unit is at least 50% of the thermal energy required for the endothermic release reaction in the dehydrogenation unit, more particularly at least 70%, more particularly at least 80%, more particularly at least 90%, more particularly at least 95% and more particularly at least 100%, ensures sufficient supply of heat to the dehydrogenation unit. If the heat transferred from the thermal conversion unit to the dehydrogenation unit is 100%, based on the thermal energy required for the release reaction, additional energy sources are dispensable. The dehydrogenation reaction in the dehydrogenation unit can then be carried out independently.

A method, in which the removal in the separation/purification unit is subject to an operating pressure and the purging in the separation/purification unit is subject to a purging pressure, for which $p_1 > p_2$, more particularly $p_1 > 1$ bara, more particularly $p_1 \geq 3$ bara and more particularly 5 bara $\leq p_1 \leq 20$ bara, more particularly 0.01 bara $\leq p_2 \leq 1.5$ bara, more particularly 0.05 bara $\leq p_2 \leq 1.2$ bara and more particularly 0.1 bara $\leq p_2 \leq 1.0$ bara, enables an advantageous pressure swing adsorption. It is essential that an operating pressure at which the removal takes place in the separation/purification unit is greater than a purging pressure at which the at least one impurity is parted from the adsorbent. The operating pressure is, in particular, greater than 1 bar, more particularly at least 3 bar and more particularly between 5 bar and 10 bar. The purging pressure is, in particular, less than the operating pressure and in particular is less than 5 bar and more particularly between 1 bar and 3 bar. When a vacuum pump is used, the purging pressure may in particular be less than 1 bar, more particularly less than 100 mbar, more particularly less than 50 mbar and more particularly less than 20 mbar.

A method, in which the purge gas fed into the separation/purification unit during purging has a purge gas temperature which is in particular at least 20° C., more particularly at least 40° C. and more particularly at most 160° C., enables an additional improvement in the purification result.

The temperature of the dehydrogenation mixture fed to the separation/purification unit is in particular less than 50° C. and more particularly is between 20° C. and 45° C. The temperature of the purge gas for purging the separation/purification unit is at most 160° C., more particularly at most 170° C. and more particularly at most 180° C. The temperature of the purge gas for purging the separation/purification unit is in particular at least 40° C., more particularly at least 30° C. and more particularly at least 20° C. The temperature of the purge gas for purging the separation/purification unit, in the case of pressure swing adsorption without additional conditioning, is in particular between 20° C. and 50° C. In the case of pressure swing adsorption with additional conditioning, the temperature of the purge gas for purging the separation/purification unit is in particular between 80° C. and 150° C. In the case of the additional conditioning of the pressure swing adsorption, the adsorbent material can be heated directly, in particular by means of steam and/or hot nitrogen. The pressure in the separation/purification unit is held constant. In the case of pressure swing adsorption with additional conditioning, the pressure during the desorption is reduced and at the same time the temperature is increased. The temperature increase may be accomplished via the direct heating of the adsorber vessel and/or by means of the feeding of heated purge gas. Active cooling is not necessarily provided, but may take place via the feed of relatively cool dehydrogenation mixture. Additionally or alternatively, the adsorber vessel may be cooled actively or passively after desorption has taken place, more particularly by delivery of the heat to the surroundings. In the case of short cycle times, in particular, active cooling is advantageous to ensure sufficient heat discharge. This may be accomplished via the feed of cold purge gas and/or via heat exchangers, more particularly cooling coils, which are connected to the adsorber bed. It is advantageous to cool the adsorber bed with cold purge gas, so that the purge gas heated by the adsorber bed can be utilized for heating or preheating the downstream desorption vessel. The overall efficiency of the method is increased, as the overall energy requirement is reduced. This method is particularly advantageous in the case of at least four adsorber vessels.

A method, in which the hydrogen gas removed by means of the separation/purification unit has a purity which is at least 99.9%, more particularly at least 99.99% and more particularly at least 99.995%, enables the provision of hydrogen gas with an enhanced purity. A purity of 100% means that a hydrogen gas stream is free of further constituents, especially impurities. A purity of 99.9% means correspondingly that impurities may be present in the hydrogen gas and amount to at most 0.1%, based on the hydrogen gas volume.

A method, in which the release reaction in the dehydrogenation unit takes place at a temperature of at least 200° C., more particularly in a temperature range from 240° C. to 320° C., enables reliable dehydrogenation of the hydrogen carrier medium with integration of the heat provided from the thermal conversion unit.

A method comprising conditioning of the dehydrogenation mixture before it is fed to the separation/purification unit, the conditioning comprising, in particular, cooling, condensation and/or recuperation, ensures reliable pretreatment of the dehydrogenation mixture and in particular simplifies the separation of liquid and gaseous constituents in the dehydrogenation mixture. As a result, the effort for removing the hydrogen gas from the dehydrogenation mixture in the separation/purification unit is simplified.

The recuperation comprises, in particular, the contacting of the dehydrogenation mixture with a stream to be heated, more particularly with the at least partly laden hydrogen carrier medium which is fed for dehydrogenation to the dehydrogenation unit.

As a result of the recuperation, the dehydrogenation mixture is cooled. This allows, in particular, vaporous fractions of the hydrogen carrier medium to be condensed and removed reliably as liquid from the dehydrogenation mixture. The cooling results in condensation. The conditioning of the dehydrogenation mixture comprises, in particular, conditioning of the at least partly unladen hydrogen carrier medium as well, which in particular has a residual fraction of physically dissolved hydrogen gas. The removal of this fraction of physically dissolved hydrogen gas may take place in the conditioning step and in particular prior to the feeding of the dehydrogenation mixture into the separation/purification unit.

A plant according to the invention has essentially the advantages of the method of the invention, to which reference is hereby made. It is essential that the dehydrogenation unit is fluidically connected to the separation/purification unit, and the separation/purification unit fluidically connected to the thermal conversion unit. Between the separation/purification unit and thermal conversion unit, advantageously, is a buffer vessel, which serves to compensate pressure fluctuations and/or delivery fluctuations along the fluid conduit. As a result, continuous feeding of combustion gas into the thermal conversion unit is improved and, in particular, ensured.

Additionally, the purge gas feed is fluidically connected to the separation/purification unit. The fluidic connection of the purge gas feed may be implemented in addition to the fluidic connection to the dehydrogenation unit. It is also conceivable, however, for there to be only one fluidic connection to the separation/purification unit, especially when the dehydrogenation mixture is used as purge gas. Also essential is the heat transfer unit for transferring the heat generated in the thermal conversion unit to the dehydrogenation unit. The heat transfer unit is implemented in particular as a heat exchanger. Heat is transferred from the thermal conversion unit to the dehydrogenation unit by the feeding of the heat of combustion to a thermal oil circuit, more particularly an existing thermal oil circuit, between a thermal oil system and the dehydrogenation unit, i.e., the reactor. This may take place either directly or indirectly via at least one additional thermal oil circuit. The additional thermal oil circuit may be made smaller in size than the existing thermal oil circuit. The additional, smaller thermal oil circuit is heated by means of the heat of combustion and, by means of a heat exchanger, transfers its heat to the existing, main thermal oil circuit of the dehydrogenation unit.

A plant of the invention can be employed with particular advantage as a mobile plant in a vehicle such as a boat, a train and/or a bus, for example, where the vehicle may be driven by means of a fuel cell and/or a hydrogen combustion engine. The plant may also be utilized for supplying purified hydrogen gas to a hydrogen filling station. Additionally or alternatively, the plant may also serve to allow the dehydrogenation unit to be operated independently if all of the heat demand for the dehydrogenation reaction is provided by the thermal conversion unit. This opens up the possibility in particular of operating the separation/purification unit with short cycle times, the cycle time being the sum total duration of an adsorption time and a desorption time. A shortened cycle time results in a relatively increased amount of combustible purge gas. A shortened cycle time therefore makes it possible to implement the adsorber vessel at reduced construction size, and in particular to reduce the amount of the adsorbent material required. The capital costs and the operating costs of such a plant, especially with a separation/purification unit of this kind, are reduced. A plant of this kind is advantageous economically and environmentally.

A plant, in which the separation/purification unit comprises at least one vessel in which there is an adsorbent, enables flexible configuration of the separation/purification unit. The removal performance of the separation/purification unit, in other words the volume flow of the dehydrogenation mixture that can be fed into the separation/purification unit, is, in particular, scalable without complication. It is possible in particular to provide multiple vessels each accommodating adsorbent. The vessels may be connected in parallel and/or in series with one another. In particular, downtimes of the separation/purification unit may be reduced and in particular avoided if there is always at least one vessel with adsorbent provided that can be utilized for removing the hydrogen gas from the dehydrogenation mixture. In the interim, further vessels can be purged. It has proven to be advantageous if at least one vessel is in adsorption mode while at least one further vessel at the same time is in desorption mode. With particular advantage, at least two, more particularly at least four, more particularly at least six and more particularly at least eight vessels are operated simultaneously. It is advantageous for the number of vessels to be even, in which case two respective vessels can be operated as a pair. This increases the degree of utilization of the vessels.

Serving as adsorbent in particular are porous materials such as, for example, zeolites, silica, activated carbon, aluminium oxide and/or carbon molecular sieves (CMS). The separation/purification unit is implemented in particular as a vessel accommodating a bed with adsorbent material.

A plant, in which the dehydrogenation unit is connected by means of a discharge conduit, more particularly directly, to the thermal conversion unit and/or to the purge gas feed, enables direct utilization of the dehydrogenation mixture as combustion gas and/or as purge gas.

A plant, in which the purge gas feed is connected by means of a direct conduit, more particularly directly, to the thermal conversion unit, enables direct utilization of the purge gas as combustion gas in the thermal conversion unit.

A plant, in which a hydrogen gas discharge conduit (15) connected to the separation/purification unit (6) is connected by means of a return conduit (20, 21), more particularly directly, to the thermal conversion unit and/or to the purge gas feed, reduces the deployment of different media in the plant, allowing purified hydrogen gas to be utilized as purge gas and/or as combustion gas directly. The effect of this in particular is to enable independent operation of the dehydrogenation unit.

Not only the features specified in the claims but also the features specified in the working examples of a plant of the invention are suitable, in each case on their own or in combination with one another, for developing the subject matter of the invention. The respective combinations of features do not constitute any limitation on the developments of the invention subject matter, but are instead essentially only illustrative in character.

Further features, advantages and details of the invention are apparent from the description that follows of three working examples with reference to the drawing.

DESCRIPTION OF THE PREFERRED EMBODIMENTS

Figure 1:
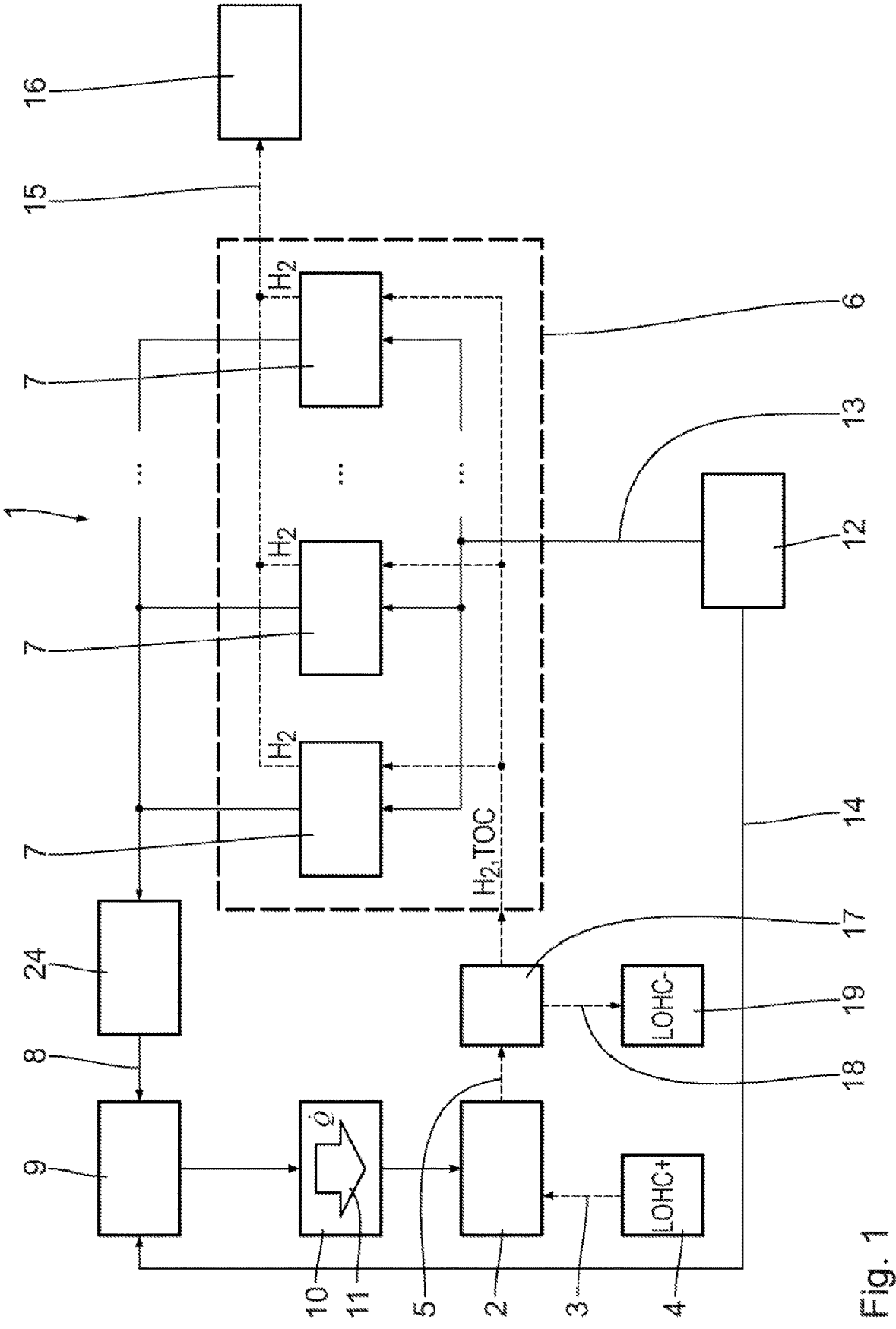
FIG. 1 shows a schematic representation of a plant of the invention wherein air and/or combustion gas is utilized as purge gas.

A plant characterized as a whole with 1 in FIG. 1 comprises a dehydrogenation unit 2 in which at least partly laden hydrogen carrier medium is dehydrogenated by means of a catalytic dehydrogenation reaction. As a result, a so-called dehydrogenation mixture is released from the hydrogen carrier medium, and comprises hydrogen gas and at least one impurity. Accommodated in the dehydrogenation unit 2 is a dehydrogenation catalyst.

A feed conduit 3 serves for feeding the at least partly laden hydrogen carrier medium (LOHC+) into the dehydrogenation unit. The hydrogen carrier medium at least partly unladen as a result of the dehydrogenation reaction is also referred to as LOHC−. According to the working example shown, a storage vessel 4 serves to hold a reservoir of the LOHC+, and a connection conduit to a supply network may also serve as a source of LOHC+.

The dehydrogenation unit 2 is fluidically connected to a separation/purification unit 6 by means of a fluid conduit 5. Arranged along the fluid conduit 5 is a removal unit 17, in particular upstream of the separation/purification unit 6. Connected to the removal unit 17 via a fluid conduit 18 is a storage vessel 19, which serves for keeping a reservoir of and storing unladen hydrogen carrier medium LOHC−.

The separation/purification unit 6 has at least one and more particularly multiple vessels 7 each of which accommodates an adsorbent, more particularly in the form of a zeolite, silica and/or activated carbon. According to the working example shown, three vessels 7 are provided, and are connected in parallel to one another, thus being connected in the same way to the fluid conduit 5. It is also conceivable for the vessels 7 to be connected to one another sequentially, i.e. according to a serial connection, additionally or alternatively to the parallel connection.

It is possible to provide greater or fewer than three vessels 7 in the separation/purification unit 6. It is advantageous if the number of vessels 7 is even. The separation/purification unit 6 is fluidically connected to a thermal conversion unit 9 by means of a further fluid conduit 8. The thermal conversion unit 9 is implemented as a combustion unit.

Disposed between the thermal conversion unit 9 and the dehydrogenation unit 2 is a heat transfer unit 10 for transferring heat generated in the thermal conversion unit 9 to the dehydrogenation unit 2. The heat flow Q from the thermal conversion unit 9 to the dehydrogenation unit 2 is represented symbolically in FIG. 2 by means of the arrow 11. The heat transfer unit 10 is implemented as a heat exchanger. Other forms of implementation for the heat transfer unit are also possible, for enabling the heat flow Q from the thermal conversion unit 9 to the dehydrogenation unit 2.

A purge gas feed 12 is fluidically connected to the separation/purification unit 6 via a purge gas conduit 13. The purge gas conduit 13 is connected to the individual vessels 7 of the separation/purification unit 6. The purge gas conduit 13 is disposed additionally to the fluid conduit 5. In addition, the purge gas feed 12 is connected directly to the thermal conversion unit 9 by means of a direct conduit 14.

The purge gas feed 12 is implemented in particular by a purge gas source, more particularly in the form of a storage vessel for keeping a reservoir of the purge gas. The purge gas feed, more particularly the purge gas source, may also be implemented as a supply conduit which is connected to a conduit network, not represented, that may be implemented locally, regionally and/or supra-regionally, for example.

Connected to the separation/purification unit 6 is a hydrogen gas discharge conduit 15, for discharging hydrogen gas removed in the separation/purification unit 6 and hence purified. The hydrogen gas discharge conduit 15 may open into a hydrogen utilization unit 16, which may be implemented, for example, as a fuel cell. The hydrogen utilization unit 16 may, however, also utilize the hydrogen gas in another way. Additionally or alternatively, it is also conceivable for the hydrogen gas discharge conduit 15 to open into a hydrogen gas interface for providing hydrogen gas for a further utility. At the hydrogen gas interface there may be a buffer store for the at least temporary, interim storage of purified hydrogen gas.

Arranged along the fluid conduit 8, in particular between the separation/purification unit 6 and the thermal conversion unit 9, is at least 1 buffer vessel 24. It is also conceivable to provide multiple buffer vessels 24, which in particular may also each be disposed directly downstream of a respective vessel 7, so that, in particular, there is a buffer vessel 24 assigned to each vessel 7. The buffer vessel 24 enables the interim storage of the gas stream for discharge into the thermal conversion unit 9. As a result, pulses owing to the pressure swing in the separation/purification unit 6 for the thermal conversion unit 9 can be neutralized and, in particular, prevented.

A method for operating the plant 1, i.e., for providing purified hydrogen gas, is elucidated in more detail below, with reference to FIG. 1.

The dehydrogenation unit 2 is fed with at least partly laden hydrogen carrier medium LOHC+ from the storage vessel 4. In the dehydrogenation unit 2, a catalytic dehydrogenation reaction takes place, with LOHC+ being unladen at least partly to give LOHC−. As a result, LOHC+ is converted into at least partly unladen hydrogen carrier medium LOHC− and a dehydrogenation mixture is released which comprises hydrogen gas Hz and at least one impurity, more particularly TOC, inert gases, methane, carbon monoxide and/or carbon dioxide. For simplification, the at least one impurity is represented symbolically in FIG. 1 by "TOC"; alternatively or additionally to TOC, the other aforementioned impurities may also be present.

The dehydrogenation mixture is discharged from the dehydrogenation unit 2 via the fluid conduit 5 and fed to the removal unit 17. In the removal unit 17, LOHC− is removed from the dehydrogenation mixture and fed via the fluid conduit 18 to the storage vessel 19.

The dehydrogenation mixture is fed to at least one of the vessels 7 of the separation/purification unit 6, and hydrogen gas is removed from the dehydrogenation mixture and fed via the hydrogen gas discharge conduit 15, at high purity, to the hydrogen utilization unit 16.

The hydrogen gas is removed from the dehydrogenation mixture by means of pressure swing adsorption. At an operating pressure $p_1$, which in particular is greater than 1 bar, hydrogen gas is able to pass through the adsorbent accommodated in the respective vessel 7. The at least one impurity is adsorbed on the adsorbent and removed from the dehydrogenation mixture in purification.

As the operating time progresses, the adsorbent becomes saturated. At regular intervals of time, therefore, the separation/purification unit 6, and more particularly the individual vessels 7, undergo a purging procedure. To ensure continuous operation of the plant 1 it is possible to connect the vessels 7 in such a way that always at least one vessel 7 is operated in removal mode, i.e., at the operating pressure $p_1$, so ensuring continuous provision of purified hydrogen gas $H_2$.

In purge operation, a purging pressure $p_2$, which is lower than the operating pressure $p_1$, prevails in the separation/purification unit 6, in other words in the respective purged vessel 7. As a result of the purging, the at least one impurity adsorbed on the adsorbent is parted from the adsorbent. The agent for this is the purge gas fed from the purge gas feed 12 via the purge gas conduit 13 to the particular purged vessel 7. According to the first working example, the purge gas used is a carbon-containing combustion gas, especially methane. The purge gas and the at least one impurity which has been parted from the adsorbent form the tail gas mixture, which is fed from the separation/purification unit 6 via the further fluid conduit 8 to the thermal conversion unit 9 where it is thermally converted—that is, burnt. The heat of combustion generated in the thermal conversion unit 9 is transferred as heat flow $\dot{Q}$ by means of the heat transfer unit 10 to the dehydrogenation unit 2. As a result, additional heat is provided for the endothermic dehydrogenation reaction, so reducing the energy requirement for the feed of heat in the dehydrogenation unit 2.

Calculations by the applicant in relation to a simplified mass balance have shown that an increased yield of hydrogen gas is possible if the carbon-containing combustion gas is used as purge gas. These calculations are based on simplifying assumptions. The theoretically possible yield is in particular at least 99%. The minimum yield, especially under practical conditions, may also be smaller and may in particular be at least 95%, more particularly at least 97% and more particularly at least 98%. Furthermore, a high heat provision of theoretically 12.5 kWh/kg$_{H2}$ is possible and so exceeds the theoretical heat demand for the dehydrogenation reaction of about 11 kWh/kg$_{H2}$. This means that the plant 1 can be operated completely independently, in other words without additional heat generation for the dehydrogenation reaction. In particular, additional emissions, especially in the form of $CO_2$, for the additional heat generation are avoided.

An additional method option for the plant 1 results from the feeding of the purge gas, more particularly carbon-containing combustion gas, from the purge gas feed 12 via the direct conduit 14 directly, in other words without mediation, to the thermal conversion unit 9. This permits the provision, more particularly the time-flexible provision, of heat via the thermal conversion unit 9. This is useful especially for activating the dehydrogenation unit 2 and the heat required for said unit.

The plant 1 according to FIG. 1 may also be operated with an alternative method, by using air and more particularly ambient air, i.e., not a carbon-containing combustion gas, as purge gas. In this case, air is used as purge gas for purging the vessels 7. The parting of the at least one impurity from the adsorbent converts the inherently incombustible purge gas, namely air, into a combustible tail gas mixture and so upgrades it in terms of the thermal conversion.

Via the direct conduit 14, the oxygen required for the thermal conversion in the thermal conversion unit 9 can be provided directly.

Furthermore, there is a reduction in $CO_2$ emissions relative to the use of a combustion gas as purge gas, as set out above. The relative emission value in this context is 0.2 $kg_{CO2}/kg_{H2}$. The emissions are based exclusively on the combustion of the at least one impurity, more particularly of TOC. Because air and more particularly ambient air is used as purge gas, the amount of oxygen needed for the combustion in the thermal conversion unit 9 is reduced.

Figure 2:
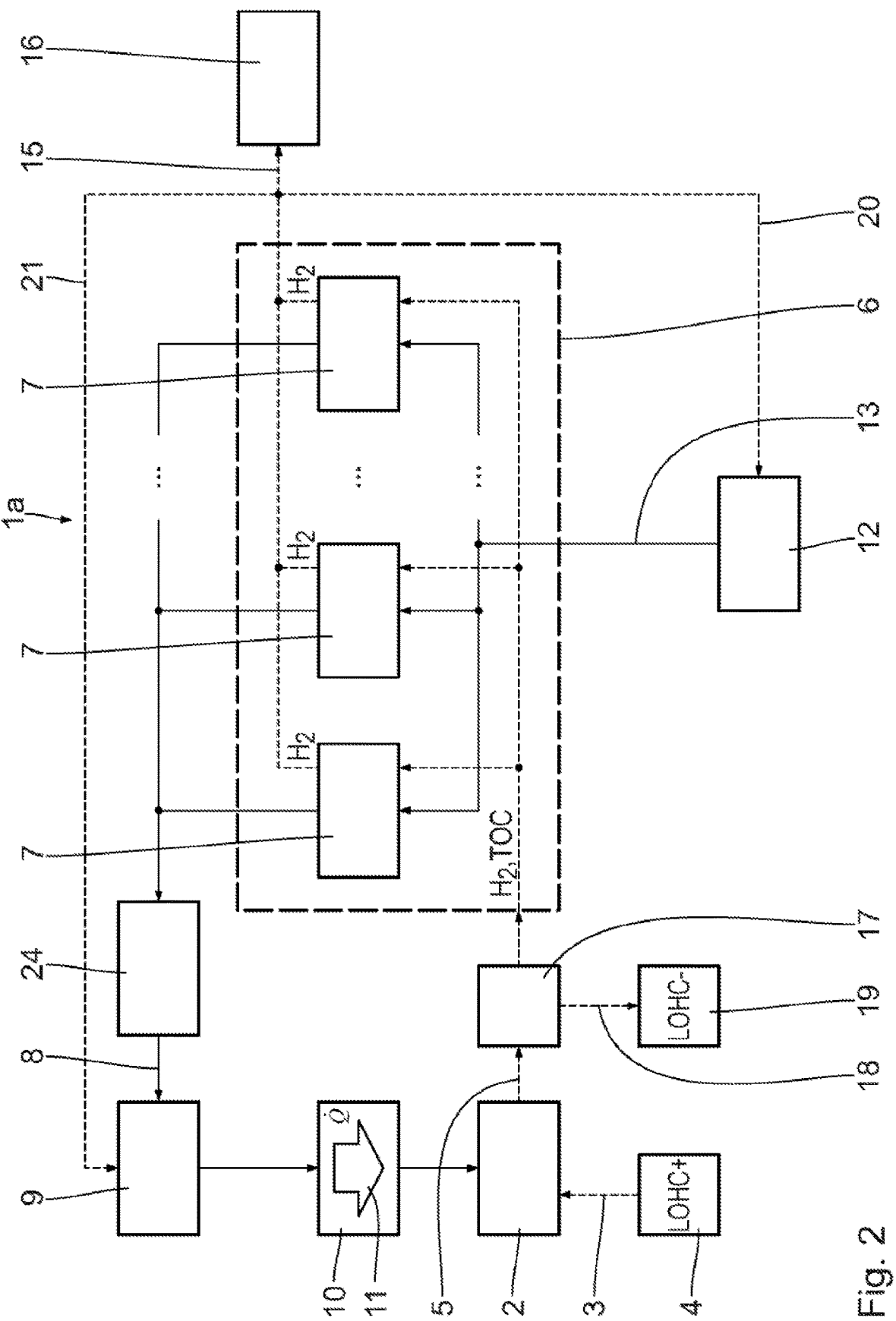
FIG. 2 shows a representation corresponding to FIG. 1, wherein purified hydrogen gas is utilized as purge gas and/or combustion gas.

Described below with reference to FIG. 2 is a second working example of the invention. Parts of identical construction receive the same reference symbols as for the first working example, the description of which is hereby referenced. Parts differing in construction but having the same function receive the same reference symbols with a post-positioned a.

The essential difference in the plant 1a relative to the preceding working example is that purified hydrogen gas $H_2$ is used as purge gas. For this purpose, the hydrogen gas discharge line 15 is connected via a first return conduit 20 to the purge gas feed 12. Additionally there is a second return conduit 21 connected to the hydrogen discharge conduit 15, opening into the thermal conversion unit 9. Purified hydrogen gas $H_2$ can be fed directly to the thermal conversion unit 9 via the second return conduit 21. The second return conduit 21 corresponds essentially to the direct conduit 14 according to the first working example.

The first return conduit 20 and/or the second return conduit 21 branch off from the hydrogen gas discharge conduit 15 in particular on the upstream side relative to the hydrogen utilization unit 16.

Because purified hydrogen gas $H_2$ is used as purge gas, the provision of heat is increased relative to the use of air as purge gas. The theoretical hydrogen gas yield is about 90%. Because of the combustion of hydrogen gas in the thermal conversion unit 9, the carbon dioxide emissions are reduced and correspond approximately to those when using ambient air as purge gas.

In the case of the plant 1a, the thermal conversion unit 9 may alternatively be implemented by a fuel cell as well, more particularly a solid oxide fuel cell (SOFC). In this case, advantageously, as well as the heat which is transferred to the dehydrogenation unit 2, electrical power can also be generated. The electrical power can be stored in an electric storage unit, more particularly in a battery, and/or provided directly to an electrical consumer.

Figure 3:
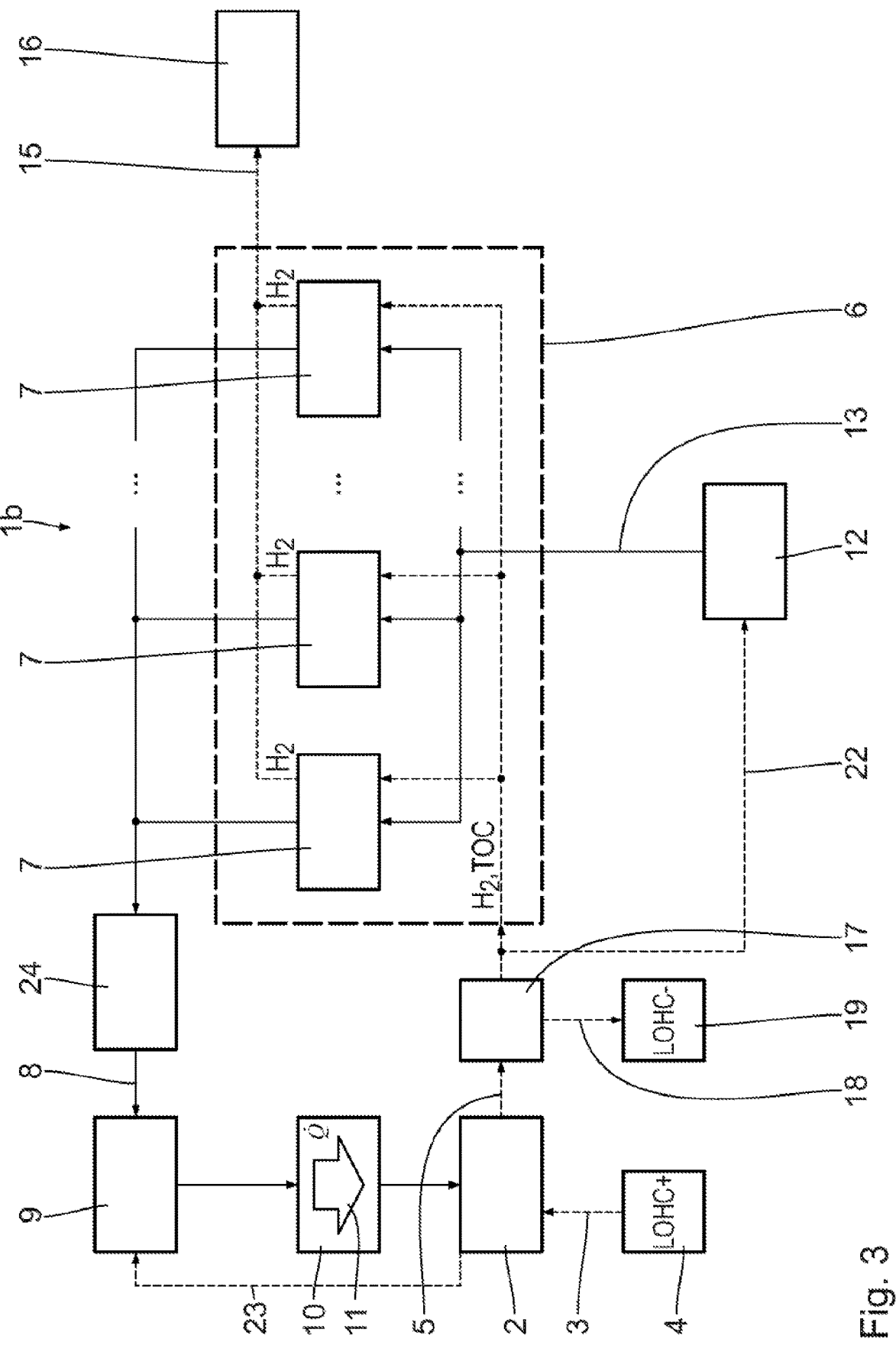
FIG. 3 shows a representation corresponding to FIG. 1, wherein the dehydrogenation mixture is used as purge gas and/or combustion gas.

Described below with reference to FIG. 3 is a third working example of the invention. Parts of identical construction receive the same reference symbols as for the first two working examples, the description of which is hereby referenced. Parts differing in construction but having the same function receive the same reference symbols with a post-positioned b.

In the plant 1b, the dehydrogenation mixture, i.e., hydrogen gas $H_2$ and the at least one impurity, serves as purge gas.

For this purpose, the dehydrogenation unit 2 is connected by means of a first discharge conduit 22 to the purge gas feed 12. Disposed between the dehydrogenation unit 2 and the purge gas feed 12 is the removal unit 17.

In addition, a second discharge conduit 23 is provided, fluidically connecting the dehydrogenation unit 2 directly to the thermal conversion unit 9. Disposed along the second discharge conduit 23 there may be a second removal unit, for removing volatile constituents of the at least partially dehydrogenated hydrogen carrier medium LOHC−. The second removal unit, which is not depicted, is implemented in particular identically to the first removal unit 17.

The characteristic values calculated via the theoretical mass balance correspond in the case of the plant 1b substantially to those of the plant 1a according to the second working example, in which purified hydrogen gas $H_2$ is used as purge gas.

The calculation results of the mass balance are summarized in table 1.

TABLE 1

| | | | CO₂ emissions through combustion | Theoretical heat provision through combustion of the purge gas (incl. impurities) |
|---|---|---|---|---|
| | | Theoretical H₂ yield | | |
| FIG. | Purge gas | (%) | $[kg_{CO2}/kg_{H2}]$ | $[kWh/kgH_2]$ |
| 1 | CH₄ | 99.0 | 2.42 | 12.54 |
| 1 | Ambient air | 99.0 | 0.22 | 1.46 |
| 2 | H₂ | 90.0 | 0.24 | 4.94 |
| 3 | Dehydrogenation mixture | 90.1 | 0.24 | 4.89 |

Results of the theoretically calculated mass balance for different purge gases

Simplifying assumptions were made for the calculations:

Serving as purge gas is 10 vol % of the amount of the purified hydrogen gas. In the separation/purification unit 6, the impurities are removed to an extent of 100%. The impurities are formed solely by TOC and amount to 1 mol % of the raw hydrogen, in other words based on the fraction of the hydrogen gas in the dehydrogenation mixture. The fraction of water in the dehydrogenation mixture is 0.1 mol %, based on the hydrogen gas in the dehydrogenation mixture. With regard to the combustion characteristics and the density, the characteristic values of methane are used for TOC. The excess of oxygen for the combustion (λ) is 3. The ambient air as purge gas contains no nitrogen. If methane or ambient air is used as purge gas, a loss of 1 vol % of hydrogen gas is brought about as a result of the displacement of purge gas.

The invention claimed is:

1. A method for providing purified hydrogen gas, comprising the method steps of
   releasing a dehydrogenation mixture comprising hydrogen gas and at least one impurity from an at least partly laden hydrogen carrier medium in a dehydrogenation unit,
   removing the hydrogen gas from the dehydrogenation mixture in a separation/purification unit,
   purging the separation/purification unit by means of a purge gas fed in via a purge gas feed,
   thermally converting a tail gas mixture comprising the purge gas and at least one impurity, in a thermal conversion unit,
   transferring heat generated in the thermal conversion unit to the dehydrogenation unit by means of a heat transfer unit.

2. The method according to claim 1, wherein the purge gas used comprises a combustion gas.

3. The method according to claim 1, wherein the purge gas used comprises air.

4. The method according to claim 1, wherein the purge gas used comprises the dehydrogenation mixture.

5. The method according to claim 1, wherein the purge gas used comprises the hydrogen gas removed in the separation/purification unit.

6. The method according to claim 1, wherein the purge gas is fed to the thermal conversion unit directly via a direct conduit.

7. The method according to claim 1, wherein the purge gas contacts an adsorbent in the separation/purification unit and thereby parts the at least one impurity from the adsorbent.

8. The method according to claim 1, wherein the heat transferred from the thermal conversion unit to the dehydrogenation unit is at least 50% of the thermal energy required for an endothermic release reaction in the dehydrogenation unit.

9. The method according to claim 1, wherein the removal in the separation/purification unit is subject to an operating pressure (p1) and the purging in the separation/purification unit is subject to a purging pressure (p2), for which p1>p2.

10. The method according to claim 9, wherein the purge gas fed into the separation/purification unit during purging has a purge gas temperature which is at least 20° C.

11. The method according to claim 1, wherein the hydrogen gas removed by means of the separation/purification unit has a purity which is at least 99.9%.

12. The method according to claim 1, wherein a release reaction in the dehydrogenation unit takes place at a temperature of at least 200° C.

13. The method according to claim 1, comprising conditioning of the dehydrogenation mixture before it is fed to the separation/purification unit.

14. A plant for providing purified hydrogen gas, the plant comprising:
   a dehydrogenation unit for releasing a dehydrogenation mixture comprising hydrogen gas and at least one impurity from an at least partly laden hydrogen carrier medium,
   a separation/purification unit fluidically connected to the dehydrogenation unit, for removing the hydrogen gas from the dehydrogenation mixture,
   a purge gas feed fluidically connected to the separation/purification unit, for feeding purge gas into the separation/purification unit,
   a thermal conversion unit fluidically connected to the separation/purification unit, for thermally converting a tail gas mixture comprising the purge gas and at least one impurity,
   a heat transfer unit for transferring heat generated in the thermal conversion unit to the dehydrogenation unit.

15. The plant according to claim 14, wherein the separation/purification unit comprises at least one vessel in which there is an adsorbent.

16. The plant according to claim 14, wherein the dehydrogenation unit is connected by means of a discharge conduit at least one of to the thermal conversion unit and to the purge gas feed.

17. The plant according to claim 14, wherein the purge gas feed is connected by means of a direct conduit to the thermal conversion unit.

18. The plant according to claim 14, wherein a hydrogen gas discharge conduit connected to the separation/purification unit is connected by means of a return conduit at least one of to the thermal conversion unit and to the purge gas feed.

19. The method according to claim 1, wherein the purge gas used comprises at least one of methane, propane and butane.

20. The method according to claim 7, wherein the purge gas contacts at least one of zeolite, silica, activated carbon, aluminum oxide and a carbon molecular sieve.

21. The method according to claim 1, wherein the heat transferred from the thermal conversion unit to the dehydrogenation unit is 100% of the thermal energy required for the endothermic release reaction in the dehydrogenation unit.

22. The method according to claim 9, wherein the removal in the separation/purification unit is subject to an operating pressure and the purging in the separation/purification unit is subject to a purging pressure, for which 5 bara≤p1≤20 bara.

23. The method according to claim 9, wherein the removal in the separation/purification unit is subject to an operating pressure and the purging in the separation/purification unit is subject to a purging pressure, for which 0.05 bara≤p1≤1.2 bara.

* * * * *